US006607651B2

(12) United States Patent
Stiller

(10) Patent No.: US 6,607,651 B2
(45) Date of Patent: Aug. 19, 2003

(54) PROCESS AND SYSTEM FOR TREATING THE DISCHARGE STREAM FROM AN ION EXCHANGER

(75) Inventor: Alfred H. Stiller, Morgantown, WV (US)

(73) Assignee: CWS Parts Company, Morgantown, WV (US)

( * ) Notice: Subject to any disclaimer, the term of this patent is extended or adjusted under 35 U.S.C. 154(b) by 20 days.

(21) Appl. No.: 09/766,662

(22) Filed: Jan. 23, 2001

(65) Prior Publication Data
US 2001/0035353 A1 Nov. 1, 2001

Related U.S. Application Data

(63) Continuation-in-part of application No. 09/392,789, filed on Sep. 9, 1999, now abandoned.
(60) Provisional application No. 60/099,762, filed on Sep. 10, 1998.

(51) Int. Cl.$^7$ .............................................. C25D 21/22
(52) U.S. Cl. ................... 205/99; 204/DIG. 13; 205/101; 210/673; 210/720; 210/724; 210/726; 210/912; 210/913
(58) Field of Search .................. 205/99, 101, 477, 205/508, 509; 210/720, 724, 726, 912, 913, 673; 204/DIG. 13

(56) References Cited

U.S. PATENT DOCUMENTS

| 3,027,321 | A | 3/1962 | Selm et al. |
| 3,493,328 | A | 2/1970 | Nieuwenhuis |
| 3,575,854 | A | 4/1971 | Richards |
| 3,716,485 | A | 2/1973 | Robertson |
| 3,725,266 | A | 4/1973 | Haviland |
| 3,740,331 | A | 6/1973 | Anderson et al. |
| 3,810,542 | A | 5/1974 | Gloster et al. |
| 3,901,805 | A | 8/1975 | Stewart |
| 3,997,439 | A | * 12/1976 | Ayukawa ...................... 210/50 |
| 4,086,150 | A | 4/1978 | Kindl et al. |
| 4,157,942 | A | 6/1979 | Tuznik et al. |
| 4,260,491 | A | 4/1981 | Cassidy et al. |
| 4,321,149 | A | 3/1982 | Hawxhurst et al. |

(List continued on next page.)

FOREIGN PATENT DOCUMENTS

| DE | 289 030 | 4/1991 |
| JP | 49-29866 | 8/1974 |
| JP | 53-21078 | 2/1978 |
| JP | 54-51972 | 4/1979 |
| JP | 60-7993 | 1/1985 |

OTHER PUBLICATIONS

Arthur Rose et al. The Condensed Chemical Dictionary, seventh edition, Reinhold Book Corp., New York, pp 556, 1966 month of application not available.*

Primary Examiner—Roy King
Assistant Examiner—William T. Leader
(74) Attorney, Agent, or Firm—Pillsbury Winthrop LLP

(57) ABSTRACT

A method is disclosed for treating a flushing solution from an ion exchanger used in electroplating operations by co-precipitating or selectively precipitating out metal hydroxides derived from metal ions from the structures being plated in the electroplating bath, metal ions from the electrodes use in the electroplating bath and metal ions from the plating metal used in the electroplating bath, and a pH raising agent having a cation with a valence of at least 2. After the metals are precipitated out of the flushing solution, the flushing solution is aerated with carbon dioxide to precipitate out the cation from the pH raising agent as a carbonate. The carbonate precipitate is removed from the flushing solution and the resulting solution consists essentially of water that may be recycled for use in the electroplating plant or safely discharged into the environment.

39 Claims, 7 Drawing Sheets

U.S. PATENT DOCUMENTS

| | | | |
|---|---|---|---|
| 4,364,773 A | | 12/1982 | Veronneau et al. |
| 4,367,213 A | | 1/1983 | Fiorucci et al. |
| 4,520,077 A | * | 5/1985 | Lavezzari .................. 428/632 |
| 4,610,792 A | * | 9/1986 | Van Gils et al. ............ 210/639 |
| 4,671,882 A | | 6/1987 | Douglas |
| 4,680,126 A | | 7/1987 | Frankard |
| 4,705,639 A | | 11/1987 | Aldrich |
| 5,000,858 A | | 3/1991 | Manning et al. |
| 5,000,859 A | | 3/1991 | Suciu et al. |
| 5,009,793 A | | 4/1991 | Muller |
| 5,013,453 A | | 5/1991 | Walker |
| 5,106,508 A | | 4/1992 | Schwitzgebel |
| 5,160,631 A | | 11/1992 | Frost et al. |
| 5,200,088 A | | 4/1993 | Pilznienski |
| 5,211,853 A | | 5/1993 | Jackson et al. |
| 5,266,201 A | * | 11/1993 | Letourneux et al. ........ 210/620 |
| 5,277,775 A | * | 1/1994 | Neale ......................... 204/269 |
| 5,292,435 A | | 3/1994 | Schwitzgebel |
| 5,308,501 A | | 5/1994 | Eckert |
| 5,330,658 A | | 7/1994 | Grant et al. |
| 5,380,441 A | | 1/1995 | Thornton |
| 5,389,262 A | | 2/1995 | Guess |
| 5,397,478 A | | 3/1995 | Pal et al. |
| 5,407,650 A | | 4/1995 | Hartmann et al. |
| 5,415,848 A | | 5/1995 | Thornton |
| 5,427,692 A | | 6/1995 | Thornton |
| 5,545,331 A | | 8/1996 | Guess |
| 5,783,061 A | | 7/1998 | Schuurman et al. |

* cited by examiner

PROCESS AND SYSTEM FOR TREATING THE DISCHARGE STREAM FROM AN ION EXCHANGER

The present application is a continuation-in-part of U.S. application of Stiller, Ser. No. 09/392,789, filed Sep. 9, 1999, now abandoned, which in turn claims priority from U.S. provisional application of Stiller, Ser. No. 60/099,762 filed Sep. 10, 1998, the entirety of each are hereby incorporated into the present application by reference.

FIELD OF THE INVENTION

The present invention relates to a process and apparatus for treating an aqueous flushing solution discharged from an ion exchanger containing various impurities from an electroplating bath, such as, metal ions from the structures being electroplated, metal ions from the anodes used in the electroplating bath and metal ions from the plating metal.

BACKGROUND OF THE INVENTION

In general, an ion exchanger for treating liquid from an electroplating bath has columns filled with resin beads and is loaded with hydrogen ions. Liquid from the electroplating bath, which contains metal ions from the electrodes used in the bath, metal ions from the structures which have been plated in the bath and metal ions from the plating metal is flushed through the ion exchanger. The metal ions in the plating bath liquid replace the hydrogen ions in the ion exchange columns. The water discharged from the ion exchanger include hydrogen ions and the unabsorbed metal ions from the plating metal that are then supplied back to the plating bath. An example of such an exchanger is the chromapure exchanger commercially available from Ecotech located in Pickering, Ontario, Canada.

Because the ion exchange columns become loaded with metal ions over a period of use, it becomes necessary to periodically flush the apparatus to raise the hydrogen ion content in the ion exchange columns. In order to "reload" the columns with hydrogen ions, the apparatus is flushed with an acidic aqueous solution, preferably including sulfuric acid. The pH of this flushing solution is usually about 2 and preferably as close to zero as possible. As a result of such flushing, the metal ions in the columns are displaced by hydrogen ions in the solution and the stream discharged from the apparatus is an aqueous solution that contains sulfuric acid, metal ions from the electrodes, metal ions from the structures being plated, metal ions from the plating metal, sulfate ions and hydrogen ions. The pH of this discharge stream is approximately 1–3 and normally about 2.

This discharge stream must be disposed of properly and cannot simply be flushed into the sewer system or waterways due to its heavy metal content. Most heavy metals are toxic and in chrome plating operations this problem becomes more acute because chromium (VI) ions are recognized as being carcinogenic to humans. Regardless of the metal content in the aqueous discharge stream, the discharge stream must be handled appropriately and in an environmentally safe manner. One option is to simply barrel the discharged water and ship it to a hazardous materials waste site. This option is not cost-effective because the costs associated with barreling and shipping can become extremely expensive at the high volumes handled by a typical electroplater. Moreover, it is not an environmentally friendly solution permitting the recycling of the water or metals from the discharge stream.

One known method of treating this discharge stream in chrome plating operations is to direct the stream into a large container and add a reducing agent, such as elemental iron powder, to the solution. The iron reacts with the chromium (VI) ions to reduce them to chromium (III) ions. Then, in the same container, sodium hydroxide is added to the solution to raise its pH to about 10. As the solution pH reaches this point, the chromium (III) ions and the metal ions from both the structures being plated and the electrodes used in the plating bath bond with hydroxyl ions in the solution and precipitate out from the solution. Then, these precipitates are separated from the solution in a single separating step, thereby producing a semi-solid or solid sludge that has the chromium and both metals all mixed together. The resulting discharge stream after the separation step is not suitable for reuse in the electroplating process and cannot be discharged into the environment as potable water. Specifically, the sodium hydroxide is not readily removed from the discharge stream and it cannot be recycled for use in the treatment of the flushing stream. In an ever increasingly environmentally conscious world, it is always desirable to recycle products that have recycling potential.

SUMMARY OF THE INVENTION

To address the above problem, the present invention provides both a method and a system for treating an aqueous solution discharged during flushing of an ion exchanger wherein the resulting discharge solution, after treatment, consists essentially of water.

Specifically, the present invention provides a method for treating an aqueous solution discharged from an ion exchanger during a flushing thereof wherein an aqueous flushing solution, preferably comprising sulfuric acid, is caused to flow through the apparatus and the resulting aqueous discharge solution is acidic and comprises metal ions from structures being plated in an electroplating bath, metal ions from electrodes used in the electroplating bath, and the metal ions being electroplated.

The solution's pH is raised by a pH raising agent having a cation with a valence of at least 2. The pH is raised such that hydroxyl ions in the solution bond with (i) the metal ions from the structures being plated in the electroplating bath to form a first precipitate; (ii) the metal ions from the electrodes to form a second precipitate; and (iii) the plating metal to form a third precipitate.

Next, the first, second and third precipitates are removed from discharge solution. This separation can occur by co-precipitation wherein the first, second and third precipitates are removed as group or by selective precipitation wherein they may be selectively precipitated out of solution.

The discharge solution is aerated with carbon dioxide such that the cations from the pH raising agent react with carbon dioxide to form a carbonate precipitate. The calcium carbonate precipitate is then separated from the discharge solution such that the solution consists essentially of water.

The advantage of the present invention is that the discharge stream consists essentially of water and can be recycled for use within the electroplating plant or discharged back into the environment.

Other objects, features and advantages will become apparent from the following detailed description, the accompanying drawings and the appended claims.

DETAILED DESCRIPTION OF THE PREFERRED EMBODIMENT OF THE INVENTION

The method of the present invention cleanses or purifies the aqueous flushing solution discharged from an ion exchanger that is used to remove undesirable metals from electroplating baths. There are a variety of the metals and alloys that are used for electroplating on a commercial scale. Metals electroplated from specially formulated aqueous solutions include chromium, cadmium, cobalt, copper, zinc, gold, silver and tin, to name a few. Additionally, many metal alloys may be used for electroplating, for example, brass and bronze. The present invention is described with chromium as the electroplated metal, although, the methods described herein can be used to purify the flushing stream from an ion exchanger used with any electroplating process.

Figure 1:
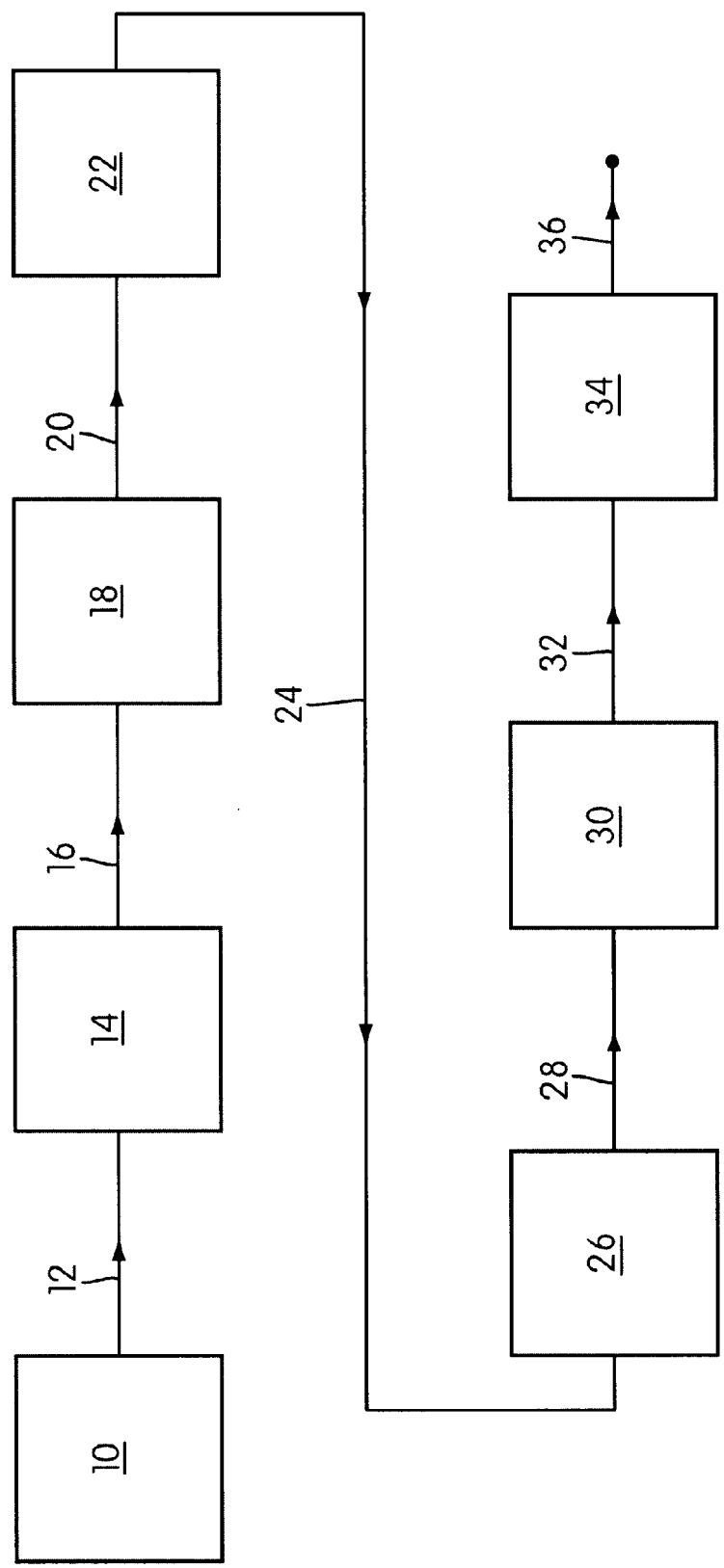
FIG. 1 schematically illustrates a system constructed in accordance with the principles of the present invention for treating the discharge stream from an ion exchanger where selective precipitation is desirable.

FIG. 1 schematically illustrates a selective metal precipitation system configured for performing the process described hereinbelow. An ion exchanger 10 is joined to an agitating device 14 via piping or hose 12. The agitating device 14 fluidly communicates with a first liquid/solid separator 18, which may be a sedimentation tank, a centrifuge, a filter press, or any other suitable device that separates precipitates from solutions, via hose or piping 16. A hose or piping 20 joins the first separator device 18 with a stirring container 22, which in turn fluidly communicates to a second liquid/separator 26 via hose or piping 24. Likewise, hoses or piping 28 fluidly communicates the second separator 26 to a sparging device 30. Hose or piping 32 fluidly communicates the sparging device 30 to a third and final liquid/solid separator 34. A final hose or piping 36 provides a discharge path through which the treated solution may flow into the sewer system, the environmental surroundings, or be recycled for internal use within the plant.

In a typical plating process, the electrodes will be copper and, accordingly, the metal ions dissolving into the plating solution from the electrodes will normally be copper (II) ions ($Cu^{+2}$); however, the electrodes do not necessarily have to be copper and thus the metal ions from the electrodes could be derived from another metal. Likewise, the structures which are being plated will most often be made of iron and thus iron (III) ions ($Fe^{+3}$) will normally be present in the water discharged from the ion exchanger; however, the structures being plated do not necessarily have to be iron and thus these metal ions could be derived from some other metal. Also, the selective and co-precipitation processes described herein both utilize a calcium-based pH raising agent for exemplary purposes only. Any pH raising agent having a metal ion that reacts with carbon dioxide to form an insoluble carbonate may used. Examples of such pH raising agents include calcium magnesium hydroxide, calcium magnesium oxide, barium hydroxide and barium oxide.

Figure 2:
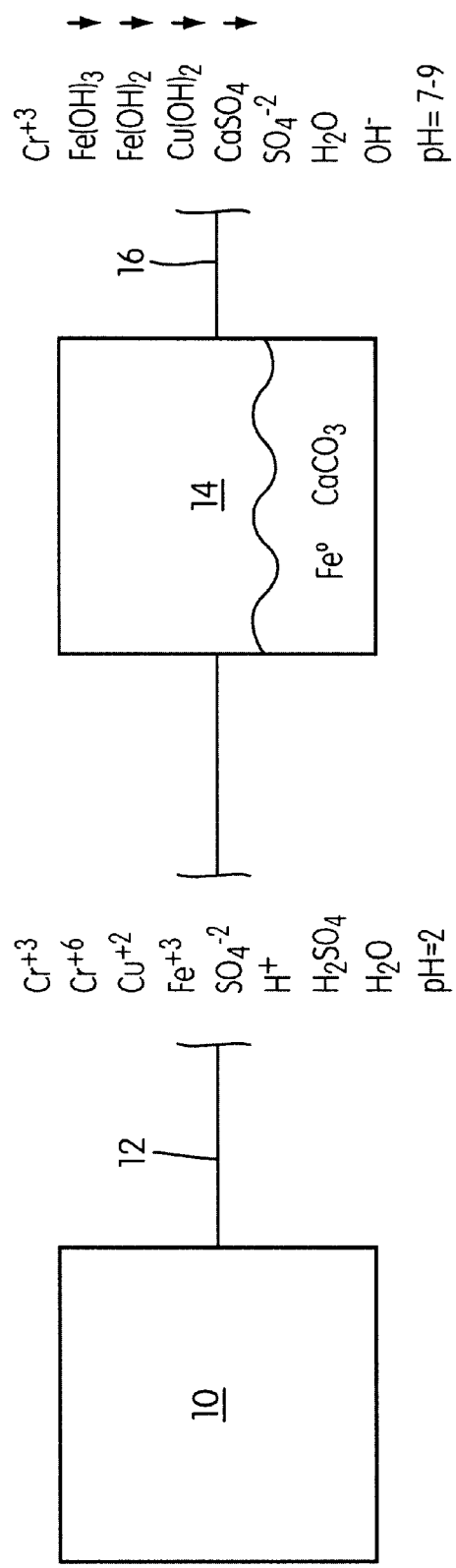
FIG. 2 schematically illustrates the ion exchanger and the agitating device used in system of FIG. 1.

The first operation in the process is to reduce the charge of the plating metal ions, which in the case of chrome plating will require chromium (VI) ions to be reduced to chromium (III) ions, and precipitate the copper (II) ions and iron (III) ions from the aqueous flushing solution discharged from the ion exchanger 10. To perform this operation, the aqueous discharge flushing solution from the ion exchanger 10 is first supplied to the agitating device 14 via piping or hose 12 (FIG. 2). The agitating device contains an effective amount of a reducing agent in the form of elemental iron ($Fe^0$) and an effective amount of a pH raising agent in the form of lime ($CaCO_3$-calcium carbonate). However, plating operations other than chrome plating may not require ion reduction and, accordingly the addition of the reducing agent would not be necessary. As the aqueous discharge solution stream leaves the ion exchanger through pipe or hose 12, the pH of the discharge stream will be about 2. Once the aqueous solution is in the agitating device 14, the reducing agent and the pH raising agent are added to the solution and cause two reactions to take place.

The elemental iron and the chromium (VI) ions react to produce iron (II) ions, iron (III) ions and chromium (III) ions as follows:

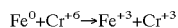

$$Fe^0 + Cr^{+6} \rightarrow Fe^{+3} + Cr^{+3}$$

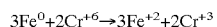

$$3Fe^0 + 2Cr^{+6} \rightarrow 3Fe^{+2} + 2Cr^{+3}$$

The limestone and sulfuric acid react to produce a calcium sulfate ($CaSO_4$) precipitate, water and carbon dioxide as follows:

$$CaCO_3 + H_2SO_4 \rightarrow CaSO_4 \downarrow + H_2O + CO_2 \uparrow$$

The carbon dioxide aerates from or "bubbles" out from the solution and the pH of the solution rises to within the range of 7–9, preferably to about 8.3. As a result of this increased pH, hydroxyl ions are formed in the solution (which is now basic). The iron (II) and iron (III) ions from the reducing agent and the structures being plated react with the hydroxyl ions ($OH^-$) to form a first precipitate comprising iron hydroxides ($Fe(OH)_2$ and $Fe(OH)_3$), and the copper (II) ions also react with the hydroxyl ions to form a second precipitate comprising copper hydroxide ($Cu(OH)_2$). It should be noted that at this point in the illustrated operation, the pH should be kept below 9 and preferably slightly lower than 8.3 to ensure that the chromium (III) ions do not precipitate out of the solution. This enables the chromium (III) ions to be precipitated separately from the other metals. Thus, the effective amount of limestone used in the vessel should be kept low enough to ensure that it does not raise the pH of the solution above this range. The resulting aqueous solution is then directed into the liquid/solid separator 18 via a hose or piping 16.

Of course, as will be discussed below, the present invention may be practiced in methods where the chromium (III) ions are precipitated out with the other metals. Co-precipitation simplifies the treatment of the flushing stream and provides for removal of the metal hydroxide precipitates as a mixed metal sludge. Selective precipitation allows the plating metal to be separated from the solution independently of the other metals in the solution. As a result, the separated metal is available for recycling. Specifically, the plater can reuse the recovered metal in his electroplating bath, thereby reducing the plater's initial material costs for performing electroplating operations. In addition, because the plating metal is separated from the other metal precipitates, the other metal precipitates may be disposed of in a normal manner as a result of being substantially free from the toxic plating metal and thus no longer hazardous.

The use of an agitating device 14 in this situation is preferable in order to ensure that as much of the elemental iron and limestone as possible is exposed to the aqueous solution. This enhances the reactions and ensures that effective amounts of the elemental iron and the limestone are added to the solution.

Figure 3:
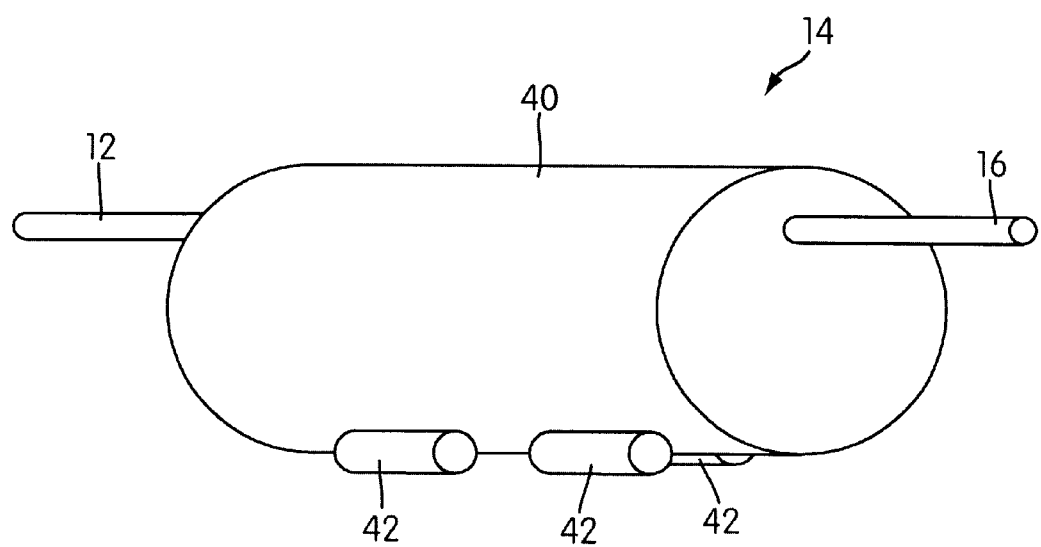
FIG. 3 illustrates a tumbler barrel that is preferably used as the agitating device in the system of FIG. 1.

Preferably, the agitating device is in the form of an agitating barrel or tumbler, as shown at 40 in FIG. 3. Any type of agitating device 14 may be used, although the use of a barrel 40 mounted on a set of rollers 42 for reciprocating partial rotations about its longitudinal axis is preferred in view of its simplicity and cost-effectiveness. These partial rotations stir up the limestone and the elemental iron to ensure that they are effectively added to the aqueous solution. The barrel 40 illustrated has a volume of approximately 100 gallons, although any size could be used depending on the plater's needs. The agitating device 14 preferably has an inlet port connected to hose or piping 12 and an outlet port connected to hose or piping 16. The inlet and outlet ports are located above the barrel's longitudinal axis so as to prevent spillage during agitation. The elemental iron ($Fe^0$) and the limestone ($CaCO_3$) are loaded into barrel 40 and normally settle on the bottom until the solution is directed into the barrel and agitation takes place.

In order to reduce costs, steel shavings from a machine shop may be used as the supply of elemental iron in the barrel. This is preferred because almost every plating plant has a machine shop with metal cutting or shaping tools that create a supply of such steel shavings.

Figure 4:
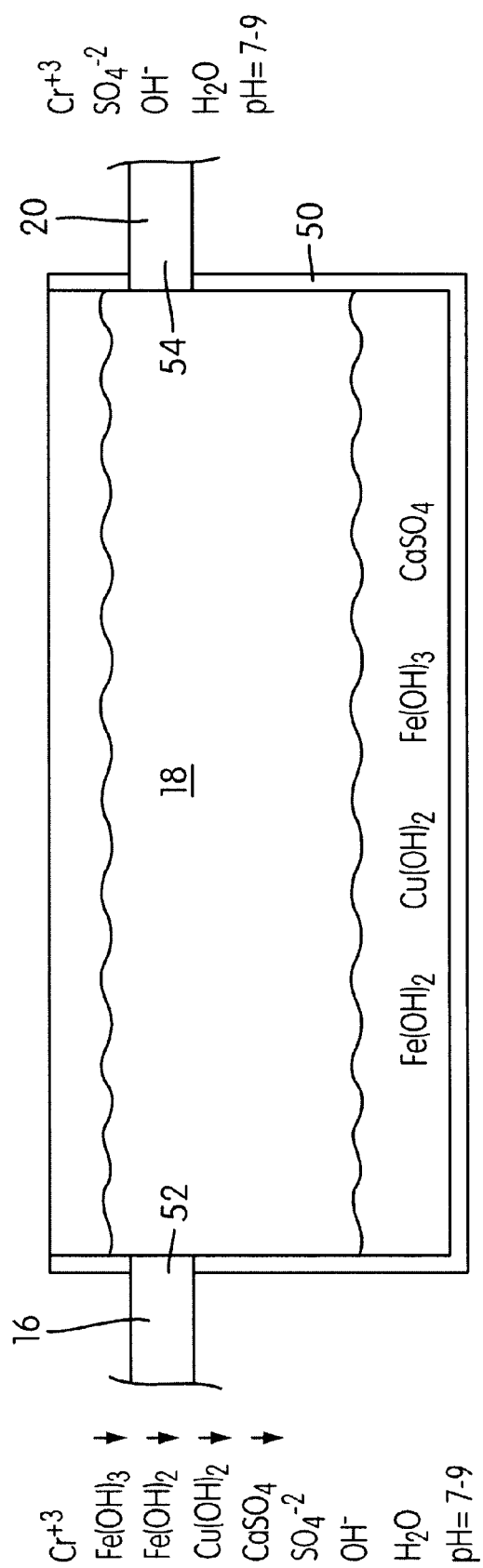
FIG. 4 illustrates the sedimentation tank that is preferably used as the first separating device in the system of FIG. 1.

FIG. 4 shows a cross-section of the first liquid/solid separator 18. The first separator 18 illustrated is a sedimentation tank 50 with an inlet port 52 that connects to hose/piping 16 and an outlet port 54 that connects to hose/piping 20. Alternatively, the first liquid/solid separator 18 may be a centrifuge, as shown in FIG. 4, with an automatic mechanism for scraping the walls after each separating process. Also, a filter press may be used in place of the sedimentation tank 50 for the first liquid/solid separator 18. Any suitable liquid/solid separating device may be used in the method of the present invention.

When the solution is directed into the tank 50 via hose/piping 16 and inlet port 52, the solution has a pH of approximately 7–9 and preferably 8.3 as mentioned above and contains hydroxyl ions, chromium (III) ions, precipitated iron (II) hydroxide, precipitated iron (III) hydroxide, precipitated copper (II) hydroxide, precipitated calcium sulfate, and may have some sulfate ions that did not react with the limestone in the agitating device 14. In the sedimentation tank 50, the precipitated solids will separate from the solution under the force of gravity and settle on the bottom of the tank 50, as shown in FIG. 4. When enough solution has been supplied to the tank to fill it up, the top layer of solution is drained off into hose/piping 20. A vacuum pump (not shown) is connected in hose/piping 20 to provide suction for affecting such drainage. Although this method leaves the lowermost layers of solution in the tank 50, it is preferred to use this method when using a sedimentation tank 50 because the precipitates tend to drop out of upper solution layers faster than they drop out of the lower solution layers simply by the nature in which gravity separation operates.

The tank 50 illustrated is a high volume tank that is capable of handling a number of 100 gallon batches from the agitating device 14. During the process, a number of batches will initially be supplied to the tank 50 for gravity separation and the upper solution layers will be drained off as described above via vacuum pumping. Over time, the precipitates deposited on the tank floor will build up to the point where the upper layers of the solution simply take too long to precipitate effectively. At this point, the tank 50 is drained and the deposited precipitates are scraped out as solid or semi-solid sludge and barreled for shipment to a waste disposal site.

Figure 5:
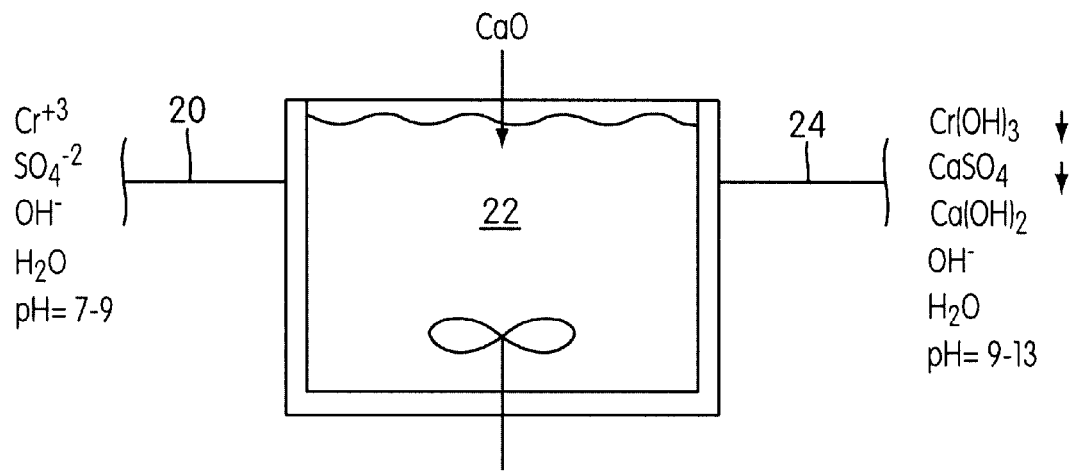
FIG. 5 schematically illustrates the stirring container used in the system of FIG. 1.

The separated solution is next supplied to a stirring container 22, as shown in FIG. 5. At this point in the process the aqueous solution has a pH of between 7–9 and preferably 8.3 and contains chromium (III) ions, hydroxyl ions and any surplus sulfate ions that did not react with the limestone in the agitating device 12. Also, some trace amounts of copper hydroxide, iron hydroxide, and calcium sulfate may not have been separated out in the sedimentation tank 50 and may remain in the solution.

A second pH raising agent in the form of quicklime (CaO) is added to the solution in the stirring container 22 until the pH is raised to within the range of 9–13, preferably about 10. At this pH, the chromium (III) ions bond with hydroxyl ions to form chromium hydroxide ($Cr(OH)_3$). Calcium ions derived from the quicklime react with any sulfate ions that may be present in the solution to produce calcium sulfate. The chromium hydroxide and the calcium sulfate precipitate from the solution as solids. In addition, any remaining calcium ions derived from the quicklime in the solution will react with hydroxyl ions to form calcium hydroxide ($Ca(OH)_2$).

Figure 6:
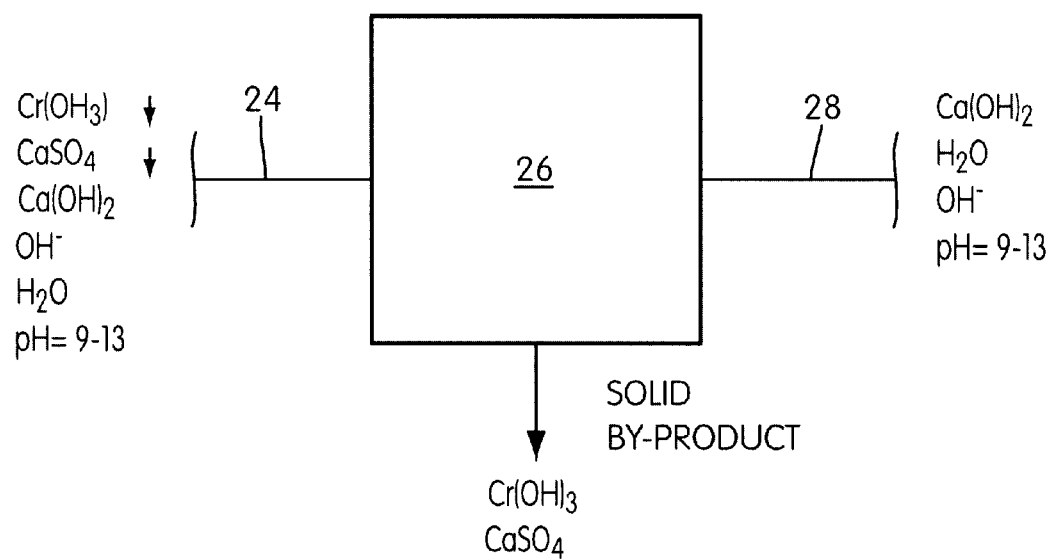
FIG. 6 schematically illustrates the second separating device used in the system of FIG. 1.

The solution is then directed into a second liquid/solid separator 26 via a hose or piping 24 to undergo a second separating operation, shown schematically in FIG. 6. In the preferred embodiment, the second separator 26 is a filter press in which the aqueous solution is forced under high pressure through a series of filtering medias. An example of such a filter press is commercially available from U.S. Filter located in Holland, Mich. However, any type of liquid/solid separator may be used, such as a centrifuge or the sedimenting tank discussed above.

With the filter press, the precipitates (i.e. the calcium sulfate and the chromium hydroxide) are separated from the solution by the filtering media of the press and the aqueous solution is then discharged from the press into hose/piping 28. Any iron hydroxide or copper hydroxide not separated during the first separation operation will now be separated during this second separating operation. The aqueous solution remaining after this second separating operation contains calcium hydroxide, trace amounts of calcium sulfate and hydroxyl ions as a result of having a pH of between 9 and 13.

Figure 7:
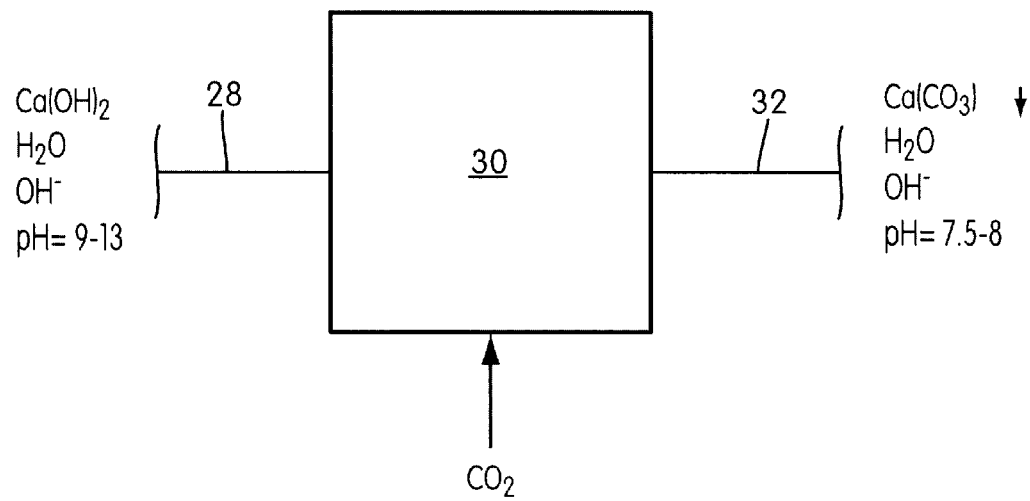
FIG. 7 schematically illustrates the sparging device used in the system of FIG. 1.

The solution is then directed to a sparging tank, generally indicated in FIG. 7 at 26, via hose or piping 28. In the sparging tank 30, the solution is aerated or "sparged" by releasing carbon dioxide ($CO_2$) bubbles into the solution. A pipe having a plurality of small holes punched in it is provided along the bottom of the tank to provide the carbon dioxide bubbles. As the carbon dioxide sparges or aerates the solution, the solution's pH lowers to approximately 7.5 to 8 and the calcium hydroxide then reacts with the carbon dioxide to form calcium carbonate (limestone) and water which remains in the solution as follows:

$$Ca(OH)_2 + CO_2 \rightarrow CaCO_3\downarrow + H_2O$$

The calcium carbonate precipitates out of the solution and the pH of the solution drops to within the range of 7.5–8.

Figure 8:
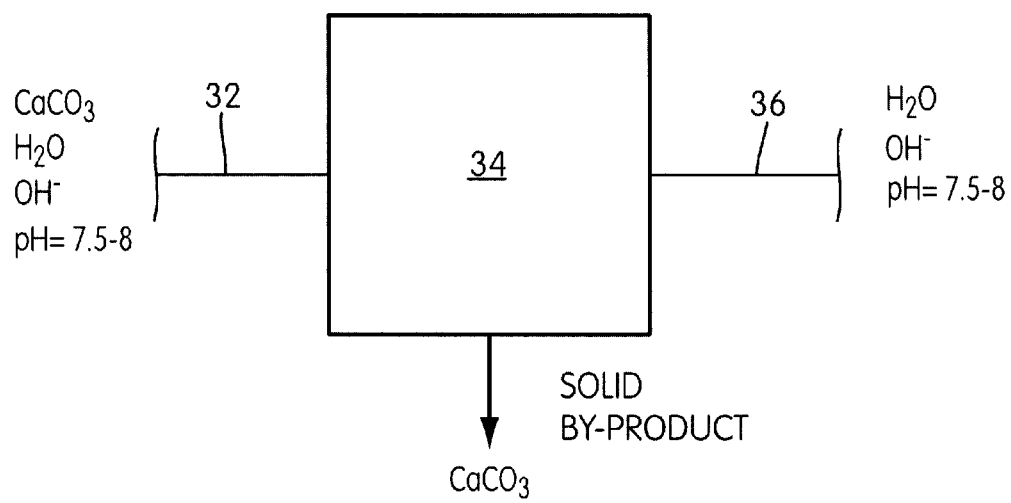
FIG. 8 schematically illustrates the third separating device used in the system of FIG. 1.

The resulting solution then undergoes a third or last separating operation in which the solution is fed into a third or last liquid/solid separator 34 via piping or hose 32, as shown in FIG. 8, and the precipitated solids are separated from the solution by the separator 34. The third or last separator is a standard water filter that has a media with a pore size small enough to filter the precipitated limestone (i.e., calcium carbonate). Any type of filter may be used. Alternatively, this third or last separating operation may be performed by sedimentation, centrifuging, or any other suitable separating operation.

The resulting solution discharged into the discharge path provided by hose/piping 36 consists essentially of water, which has a pH in the range of 7.5–8 (the water contains some hydroxyl ions as a result of having a basic pH as well as trace quantities of calcium sulfate and calcium carbonate). This water is safe, clean, and may be flushed into the sewer system, the ambient surroundings, or recycled for internal use within the plant. The water is not "hard" and will not cause undesirable deposits to build up on pipes.

Figure 9:
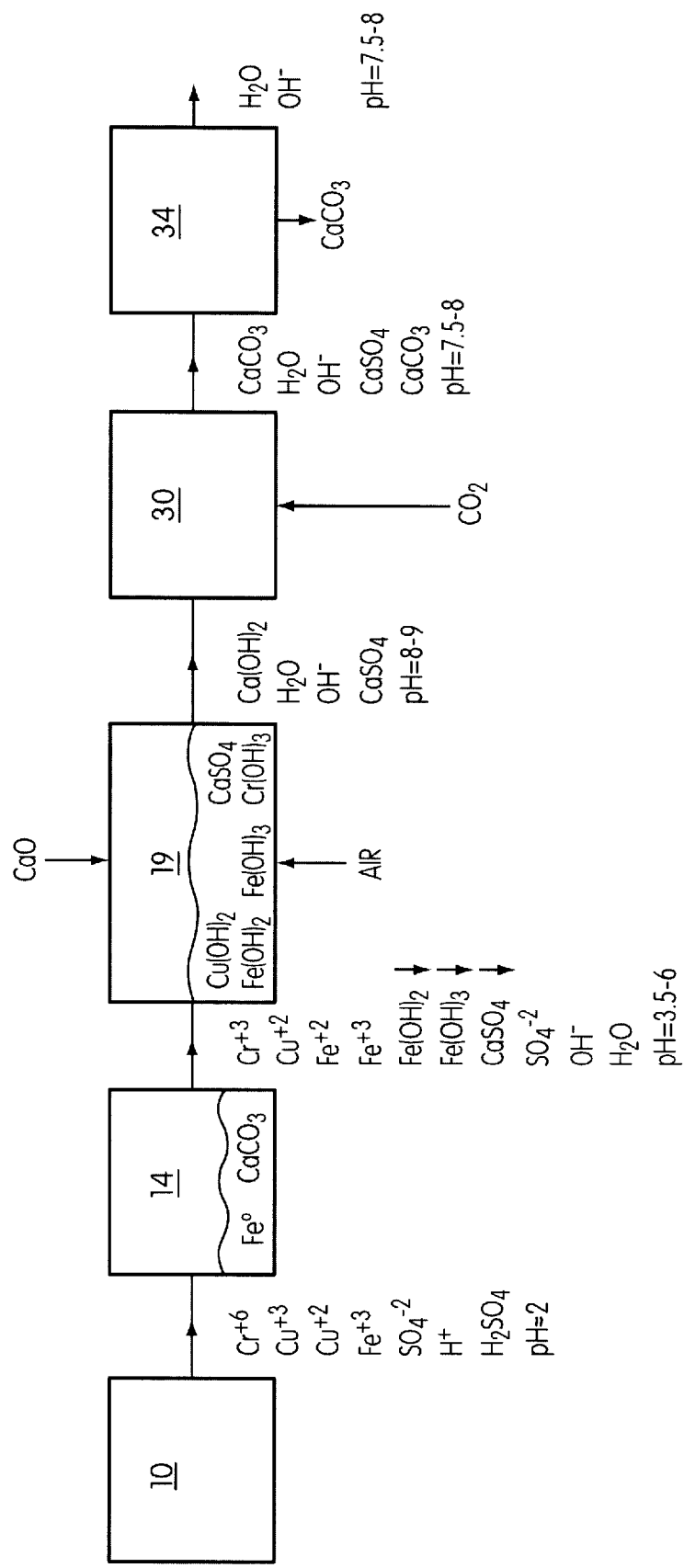
FIG. 9 schematically illustrates a system constructed in accordance with the principles of the present invention for treating a discharge stream from an ion exchanger where co-precipitation is desirable.

FIG. 9 schematically illustrates a metal co-precipitation system configured for performing the process described hereinbelow. An ion exchanger 10 is joined to an agitating device 14 via piping or hose 12. The agitating device 14 fluidly communicates with a mixing tank/clarifier 19, via hose or piping 17. A hose or piping 21 joins the mixing tank/clarifier 19 with a sparging device 30. Hose or piping 32 fluidly communicates the sparging device 30 to a final liquid/solid separator 34. A final hose or piping 36 provides a discharge path through which the treated solution may flow into the sewer system, the environmental surroundings, or be recycled for internal use within the plant. The ion exchanger 10, agitating device 14, sparging device 30 and final liquid/solid separator 34 may be designed in accordance with the embodiments described above in the selective precipitation system. However, to effectuate co-precipitation, a mixing tank/clarifier is utilized to precipitate out substantially all of the metal ions in the flushing solution except the calcium hydroxide.

The solution entering the mixing tank/clarifier 19 via hose/piping 17 has a pH of 3.5 to 6 due to the addition of calcium carbonate (i.e., a first pH raising agent) in the agitating device. The solution contains small amounts of precipitated iron (II) hydroxide and precipitated iron (III) hydroxide relative to the total quantity of iron ions in the solution, as well as, precipitated calcium sulfate, chromium (III) ions, copper ions, iron (II) ions, iron (III) ions, hydroxyl ions and sulfate ions that did not react with the limestone in the agitating device 14. Once inside the mixing tank/clarifier 19 the solution is mixed. Mixing may be accomplished by any suitable means such as agitation by propeller stirring or by aeration with compressed air introduce through perforated piping. Aeration is preferably used and has the additional effect of oxidizing the iron (II) to iron (III), although oxidation is not required to effectuate precipitation or separation of the iron hydroxides. During mixing the pH of the solution is adjusted to between 8.0 and 9.0, preferably above 8.3 by adding an effective amount of quicklime (CaO) (i.e., a second pH raising agent). At this pH, substantially all of the chromium (III) ions bond with hydroxyl ions to form chromium hydroxide ($Cr(OH)_3$), substantially all of the copper (II) ions bond with hydroxyl ions to form copper hydroxide and substantially all of the iron (III) ions bond with hydroxyl ions to form iron (III) hydroxide. Calcium ions derived from the quicklime react with the sulfate ions to produce calcium sulfate. Any remaining calcium ions (i.e., cations from the second pH raising agent) derived from the quicklime in the solution will react with hydroxyl ions to form calcium hydroxide ($Ca(OH)_2$). Also, any calcium ions from the calcium carbonate that did not form calcium sulfate will be present in the solution as calcium hydroxide. Mixing of the solution continues for an effective time until substantially all of the metal ions react to form metal hydroxides. Typically, mixing occurs for approximately 12 hours. After mixing, the iron (III) hydroxide, copper (II) hydroxide, calcium sulfate and chromium hydroxide precipitated from the solution settle as solids and form a mixed metal sludge in the basin of the mixing tank/clarifier.

The use of two pH raising agents (i.e., the calcium carbonate and the calcium oxide) is not necessary to the present invention. The illustrated method is preferred from a costs savings standpoint because calcium carbonate is less expensive than calcium carbonate. Using the calcium carbonate to perform the initial pH raising reduces the amount of calcium oxide in the second pH raising. Calcium oxide is the preferred pH raising agent because it reacts faster thereby reducing processing time. Of course, the pH could be raised using a single pH raising agent, and any agent may be used, including calcium carbonate and calcium oxide and those others mentioned herein having a cation with a valence of at least 2.

A flocculating agent may be added to aid in liquid/solid separation thereby producing a more dense and easily dewatered sludge. Flocculation is a physical-chemical process in which smaller particles agglomerate to form larger particles. These larger particles are heavier than the smaller particles, therefore, the larger particles settle more effectively. An example of such flocculating agent is polyacrylate.

The solution is then directed via hose or piping 21 to the sparging tank 28. The sparging and final separating operations are carried out as described-above in the first aspect of the present invention. Accordingly, the resulting discharge stream consists of potable water and may be recycled for use in the electroplating plant or safely discharged into the environment.

The methods of the present invention provide an inexpensive way of purifying the discharge stream from an ion exchanger. These methods utilize inexpensive and readily available materials (e.g., limestone, steel shavings, carbon dioxide) and also create byproducts which are reusable or easily disposable.

The methods and apparatuses described herein illustrate the principles of the present invention and are not intended to limit the scope of the invention. On the contrary, the present invention is intended to encompass all modifications, alterations, and equivalents which do not depart from the appended claims.

What is claimed is:

1. A method for treating an aqueous solution discharged from an ion exchanger during a flushing thereof wherein an acidic aqueous flushing solution is caused to flow through said exchanger to increase a hydrogen ion content of said exchanger and wherein the resulting aqueous discharge solution is acidic and comprises metal ions from structures being electroplated in an electroplating bath, metal ions from electrodes used in the electroplating bath, and metal ions from the plating metal in said electroplating bath, said method comprising:

adding a pH raising agent having a cation with a valence of at least 2 to said discharge solution to raise the solution's pH such that hydroxyl ions in the discharge solution (i) bond with the metal ions from the structures being plated in said electroplating bath to form a first precipitate; (ii) bond with the metal ions from said electrodes to form a second precipitate; and (iii) bond with the metal ions from the plating metal to form a third precipitate;

affecting separation of said first, second and third precipitates from said discharge solution;

aerating the discharge solution with carbon dioxide, such that said cation from said pH raising agent reacts with said carbon dioxide to form a carbonate precipitate; and separating said carbonate precipitate from said solution such that the solution consists essentially of water;

wherein adding said pH raising agent comprises:

adding a first pH raising agent having a cation with a valence of at least 2 to said discharge solution to raise the solution's pH such that hydroxyl ions in the discharge solution bond with the metal ions from the structures being plated in said electroplating bath to form at least said first precipitate;

adding a second pH raising agent having a cation with a valence of at least 2 to said discharge solution to raise the solution's pH such that hydroxyl ions in the discharge solution (i) bond with the metal ions from the structures being plated in said electroplating bath to further form said first precipitate; (ii) bond with the metal ions from the electrodes to form said second precipitate; and (iii) bond with the metal ions from the plating metal to form a third precipitate;

wherein said affecting separation of said first, second and third precipitates is formed by collectively separating said precipitates from the discharge solution after adding said first and second pH raising agents.

2. A method according to claim 1 further comprising adding a flocculating agent to said discharge solution prior to separating the first, second and third precipitates from the discharge solution.

3. A method according to claim 1, wherein the first pH raising agent is calcium carbonate.

4. A method according to claim 3, wherein the aqueous flushing solution comprises sulfuric acid and the resulting aqueous discharge solution further comprises sulfuric acid, wherein said calcium carbonate reacts with the sulfuric acid in said discharge solution to form calcium sulfate that precipitates from said discharge solution, water that remains in said discharge solution, and carbon dioxide that aerates from said discharge solution, and wherein said collective separation further comprises separating said calcium sulfate from said discharge solution along with said first, second and third precipitates.

5. A method according to claim 1, wherein the second pH raising agent is calcium oxide.

6. A method according to claim 1 wherein the pH raising agents each comprises a material selected from the group consisting of calcium hydroxide, calcium oxide, calcium magnesium hydroxide, calcium magnesium oxide, barium hydroxide and barium oxide.

7. A method according to claim 1 further comprising, after separating said carbonate precipitate, recycling said water for internal use within an electroplating plant.

8. A method according to claim 1 further comprising recovering the separated carbonate precipitate for reuse in said method.

9. A method for treating an aqueous solution discharged from an ion exchanger during a flushing thereof wherein an acidic aqueous flushing solution is caused to flow through said exchanger to increase a hydrogen ion content of said exchanger and wherein the resulting aqueous discharge solution is acidic and comprises metal ions from structures being electroplated in an electroplating bath, metal ions from electrodes used in the electroplating bath, and metal ions from the plating metal in said electroplating bath, said method comprising:

adding a pH raising agent having a cation with a valence of at least 2 to said discharge solution to raise the solution's pH such that hydroxyl ions in the discharge solution (i) bond with the metal ions from the structures being plated in said electroplating bath to form a first precipitate; (ii) bond with the metal ions from said electrodes to form a second precipitate; and (iii) bond with the metal ions from the plating metal to form a third precipitate;

affecting separation of said first, second and third precipitates from said discharge solution;

aerating the discharge solution with carbon dioxide, such that said cation from said pH raising agent reacts with said carbon dioxide to form a carbonate precipitate; and separating said carbonate precipitate from said solution such that the solution consists essentially of water;

wherein adding said pH raising agent comprises:

adding a first pH raising agent having a cation with a valence of at least 2 to said discharge solution to raise the solution's pH such that hydroxyl ions in the solution (i) bond with the metal ions from the structures being plated in said electroplating bath to form said first precipitate; and (ii) bond with the metal ions from the electrodes to form said second precipitate;

adding a second pH raising agent having a cation with a valence of at least 2 to said discharge solution to further raise the solution's pH such that said hydroxyl ions bond with the metal ions from the plating metal to form said third precipitate; and wherein said affecting separation is performed by separating said first and second precipitates after adding said first pH raising agent and then separating the third precipitate separately from the first and second precipitates.

10. A method according to claim 9, wherein the first pH raising agent is calcium carbonate.

11. A method according to claim 10, wherein the aqueous flushing solution comprises sulfuric acid and the resulting aqueous discharge solution further comprises sulfuric acid, wherein said calcium carbonate reacts with the sulfuric acid in said discharge solution to form calcium sulfate that precipitates from said discharge solution, water that remains in said discharge solution, and carbon dioxide that aerates from said discharge solution, and wherein said first separating operation further comprises separating said calcium sulfate from said solution along with said first and second precipitates.

12. A method according to claim 9, wherein the second pH raising agent is calcium oxide.

13. A method according to claim 9, further comprising recovering the third precipitate for reuse in the electroplating bath.

14. A method according to claim 9 further comprising adding a flocculating agent to said discharge solution prior to separating the first, second and third precipitates from the discharge solution.

15. A method according to claim 9, wherein said first and second pH raising agents are different pH raising agents.

16. A method according to claim 9 wherein the pH raising agents each comprise a material selected from the group consisting of calcium hydroxide, calcium oxide, calcium magnesium hydroxide, calcium magnesium oxide, barium hydroxide and barium oxide.

17. A method according to claim 9 further comprising, after separating said carbonate precipitate, recycling said water for internal use within an electroplating plant.

18. A method according to claim 9 further comprising recovering the separated carbonate precipitate for reuse in said method.

19. A method for treating an aqueous solution discharged from an ion exchanger during a flushing thereof wherein an acidic aqueous flushing solution is caused to flow through said exchanger to increase a hydrogen ion content of said exchanger and wherein the resulting aqueous discharge solution is acidic and comprises metal ions from structures being electroplated in an electroplating bath, metal ions from electrodes used in the electroplating bath, and chromium (VI) ions from the plating metal in said electroplating bath, said method comprising:
  adding a reducing agent to the discharge solution to reduce the chromium (VI) ions to chromium (III) ions;
  adding pH raising agent having a cation with a valence of at least 2 to said discharge solution to raise the solution's pH such that hydroxyl ions in the solution (i) bond with the metal ions from the structures being plated in said electroplating bath to form a first precipitate; (ii) bond with the metal ions from said electrodes to form a second precipitate; and (iii) bond with the chromium (III) ions to form a third precipitate of chromium (III) hydroxide; and
  affecting separation of said first, second and third precipitates from said discharge solution;
  aerating the discharge solution with carbon dioxide, such that said cation from said pH raising agent reacts with said carbon dioxide to form a precipitate and water; and
  separating said precipitate from said discharge solution such that the discharge solution consists essentially of water;
  wherein said adding said pH raising agent comprises:
    adding a first pH raising agent having a cationic valence of at least 2 to said discharge solution to raise the solution's pH such that hydroxyl ions in the solution bond with the metal ions from the structures being plated in said electroplating bath to form at least said first precipitate;
    adding a second pH raising agent having a cationic valence of at least 2 to said discharge solution to raise the solution's pH such that hydroxyl ions in the solution (i) bond with the metal ions from the structures being plated in said electroplating bath to further form said first precipitate; (ii) bond with the metal ions from said electrodes to form said second precipitate; and (iii) bond with the chromium (III) ions to form said third precipitate of chromium (III) hydroxide.

20. A method according to claim 19, wherein the metal ions from the structures plated in said bath are iron (III) ions and wherein the metal ions from the electrodes used in said bath are copper (II) ions.

21. A method according to claim 19 further comprising adding a flocculating agent to said discharge solution.

22. A method according to claim 19, wherein the first pH raising agent is calcium carbonate.

23. A method according to claim 19, wherein the second pH raising agent is calcium oxide.

24. A method according to claim 19, wherein the first pH raising agent raises the pH between 3.5 and 6.0.

25. A method according to claim 19, wherein the second pH raising agent raises the pH between 7 and 9.

26. A method according to claim 19, wherein the second pH raising agent raises the pH to about 8.3.

27. A method according to claim 19 wherein the flushing solution is sulfuric acid and said sulfuric acid reacts with the first and second pH raising agents to form a sulfate precipitate that is separated from the discharge solution with the first, second and third precipitates.

28. A method according to claim 19, wherein said reducing agent is elemental iron.

29. A method according to claim 28, wherein said elemental iron is derived from discarded steel shavings and wherein the iron ions from the elemental iron bond with the hydroxyl ions to further form said first precipitate.

30. A method according to claim 19 further comprising, after separating said first, second and third precipitates, recycling said water for internal use within an electroplating plant.

31. A method according to claim 19 further comprising recovering the separated first precipitate for reuse in said method.

32. A method for treating an aqueous solution discharged from an ion exchanger during a flushing thereof wherein an acidic aqueous flushing solution is caused to flow through said exchanger to increase a hydrogen ion content of said exchanger and wherein the resulting aqueous discharge solution is acidic and comprises metal ions from structures being electroplated in an electroplating bath, metal ions from electrodes used in the electroplating bath, and chromium (VI) ions from the plating metal in said electroplating bath, said method comprising:
  adding a reducing agent to the discharge solution to reduce the chromium (VI) ions to chromium (III) ions;
  adding pH raising agent having a cation with a valence of at least 2 to said discharge solution to raise the solution's pH such that hydroxyl ions in the solution (i) bond with the metal ions from the structures being plated in said electroplating bath to form a first precipitate; (ii) bond with the metal ions from said electrodes to form a second precipitate; and (iii) bond with the chromium (III) ions to form a third precipitate of chromium (III) hydroxide; and
  affecting separation of said first, second and third precipitates from said discharge solution;
  aerating the discharge solution with carbon dioxide, such that said cation from said pH raising agent reacts with said carbon dioxide to form a precipitate and water; and
  separating said precipitate from said discharge solution such that the discharge solution consists essentially of water;
  wherein adding said pH raising agent comprises:
    adding a first pH raising agent having a cation with a valence of at least 2 to said discharge solution to raise the solution's pH such that hydroxyl ions in the solution (i) bond with the metal ions from the structures being plated in said electroplating bath to form said first precipitate; and (ii) bond with the metal ions from the electrodes to form said second precipitate;
    adding a second pH raising agent having a cation with a valence of at least 2 to said discharge solution to further raise the solution's pH such that said hydroxyl ions bond with the chromium (III) ions to form said third precipitate of chromium (III) hydroxide; and wherein said affecting separation is performed by separating said first and second precipitates after adding said first pH raising agent and then separating the third precipitate separately from the first and second precipitates.

33. A method according to claim 32, wherein the first calcium-based pH raising agent is calcium carbonate.

34. A method according to claim 33, wherein the aqueous flushing solution comprises sulfuric acid and the resulting aqueous discharge solution further comprises sulfuric acid, wherein said calcium carbonate reacts with the sulfuric acid in said discharge solution to form calcium sulfate that precipitates from said discharge solution, water that remains in discharge said solution, and carbon dioxide that aerates from said discharge solution, and wherein said first separating operation further comprises separating said calcium sulfate from said solution along with said first and second precipitates.

35. A method according to claim 32, wherein the second calcium-based pH raising agent is calcium oxide.

36. A method according to claim 32, further comprising recovering the third precipitate for reuse in the electroplating bath.

37. A method according to claim 32 further comprising adding a flocculating agent to said discharge solution.

38. A method according to claim 32, wherein the metal ions from the structures plated in said bath are iron (III) ions and wherein the metal ions from the electrodes used in said bath are copper (II) ions.

39. A method according to claim 32, wherein said first and second pH raising agents are different pH raising agents.

* * * * *